US009690113B2

(12) United States Patent
Miyazaki (10) Patent No.: US 9,690,113 B2
(45) Date of Patent: Jun. 27, 2017

(54) OPTICAL APPARATUS (71) Applicant: CANON KABUSHIKI KAISHA, Tokyo (JP)

(72) Inventor: Takashi Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/571,632

(22) Filed: Dec. 16, 2014

(65) Prior Publication Data
US 2015/0177534 A1 Jun. 25, 2015

(30) Foreign Application Priority Data

Dec. 19, 2013 (JP) .................................. 2013-263098

(51) Int. Cl.
G02B 27/64 (2006.01)
G03B 17/04 (2006.01)
G02B 7/02 (2006.01)

(52) U.S. Cl.
CPC ........... *G02B 27/646* (2013.01); *G02B 7/021* (2013.01); *G02B 7/023* (2013.01); *G03B 17/04* (2013.01); *G02B 27/64* (2013.01); *G03B 2205/0046* (2013.01); *G03B 2217/002* (2013.01)

(58) Field of Classification Search
CPC .... G03B 2205/0007–2205/0015; G02B 27/64; G02B 27/646; G02B 27/642; G02B 27/644; G02B 27/648; H04N 5/23264; H04N 5/2328
USPC .................................. 359/554, 557, 813–830
See application file for complete search history.

(56) References Cited

U.S. PATENT DOCUMENTS

| 6,866,431 | B2 | 3/2005 | Namazue et al. |
| 7,815,966 | B2 | 10/2010 | Miyazaki et al. |
| 7,901,732 | B2 | 3/2011 | Yashima et al. |
| 8,606,094 | B2 | 12/2013 | Suzuka |
| 2011/0134528 | A1* | 6/2011 | Suzuka ............... G02B 27/646 359/554 |
| 2013/0188066 | A1* | 7/2013 | Suzuka ............... H04N 5/2328 348/208.11 |
| 2014/0002913 | A1 | 1/2014 | Miyazaki |

FOREIGN PATENT DOCUMENTS

JP 2013-148733 A 8/2013

* cited by examiner

Primary Examiner — Thomas K Pham
Assistant Examiner — Alberto Betancourt
(74) Attorney, Agent, or Firm — Fitzpatrick, Cella, Harper & Scinto (57) ABSTRACT An optical apparatus includes an image pickup optical system, a base member, a holder holding an optical element, and a moving member including a magnetic member and configured to move in a plane perpendicular to an optical axis. The moving member moves in a predetermined straight line between the optical axis and a center of the magnetic member in a surface perpendicular to a center of the optical element. The base member includes a first restricting portion restricting moving amounts of the moving member in one direction of the predetermined straight line, and a second restricting portion restricting moving amounts of the moving member in other direction of the predetermined straight line. The first restricting portion and the second restricting portion are arranged so that the magnetic member is sandwiched between the first restricting portion and the second restricting portion.

3 Claims, 8 Drawing Sheets

OPTICAL APPARATUS

BACKGROUND OF THE INVENTION

1. Field of the Invention

The invention relates to an optical apparatus such as a lens barrel.

2. Description of the Related Art

Conventional image pickup apparatus mounts an image stabilizer which moves an optical element in a direction perpendicular to an optical axis using a driving apparatus and a position detecting apparatus so as to correct an image blur. The image stabilizer butts an outer periphery of a holder of the optical element against other components so as to restrict a moving amount.

An image pickup apparatus which stores other components in space formed by evacuating a part of optical element groups in a non-shooting state so as to separate from an optical axis for miniaturization is known.

An image pickup apparatus which evacuates an optical element for image stabilization so as to separate from an optical axis in a non-shooting state needs a sufficient space for storing other components formed by evacuating the optical element. For securing the sufficient space for storing the other components, it is impossible to restrict a moving amount using an outer periphery of a holder of an optical element.

In Japanese Patent Laid-Open No. 2013-148733, a moving amount is restricted using an axis portion provided on a fixing member and a hole portion formed on a holding frame member which moves along with a holder of an optical element.

In Japanese Patent Laid-Open No. 2013-148733, a restriction member for restricting the moving amount is arranged at a position different from a moving axis of an image stabilizing mechanism. The arrangement of the restriction member generates a rotating force in an unintended direction when correcting an image blur, and as a result, an optical performance at an optical element for image stabilization degrades.

SUMMARY OF THE INVENTION

The invention provides a small size optical apparatus which is performable for precise image stabilizing.

An optical apparatus as one aspect of the present invention includes an image pickup optical system, a base member where an aperture is formed, a holder holding an optical element on an optical axis of the image pickup optical system, and a moving member including a magnetic member and configured to move in a plane perpendicular to the optical axis of the image pickup optical system. The moving member moves in a predetermined straight line between the optical axis and a center of the magnetic member in a surface perpendicular to a center of the optical element when viewed from an optical axis direction. The base member includes a first restricting portion restricting moving amounts of the moving member in one direction of the predetermined straight line, and a second restricting portion restricting moving amounts of the moving member in other direction of the predetermined straight line. The first restricting portion and the second restricting portion are arranged so that the magnetic member is sandwiched between the first restricting portion and the second restricting portion.

DESCRIPTION OF THE EMBODIMENTS

Exemplary embodiments of the invention will be described below with reference to the accompanying drawings. In each of the drawings, the same elements will be denoted by the same reference numerals and the duplicate descriptions thereof will be omitted.

A lens barrel as one example of an optical apparatus according to the invention is explained. The lens barrel of this embodiment is detachably mounted to an image pickup apparatus body such as a digital camera so as to serve as a camera system. A camera system including the lens barrel of this embodiment is also equivalent to the optical apparatus according to the invention.

Figure 1:
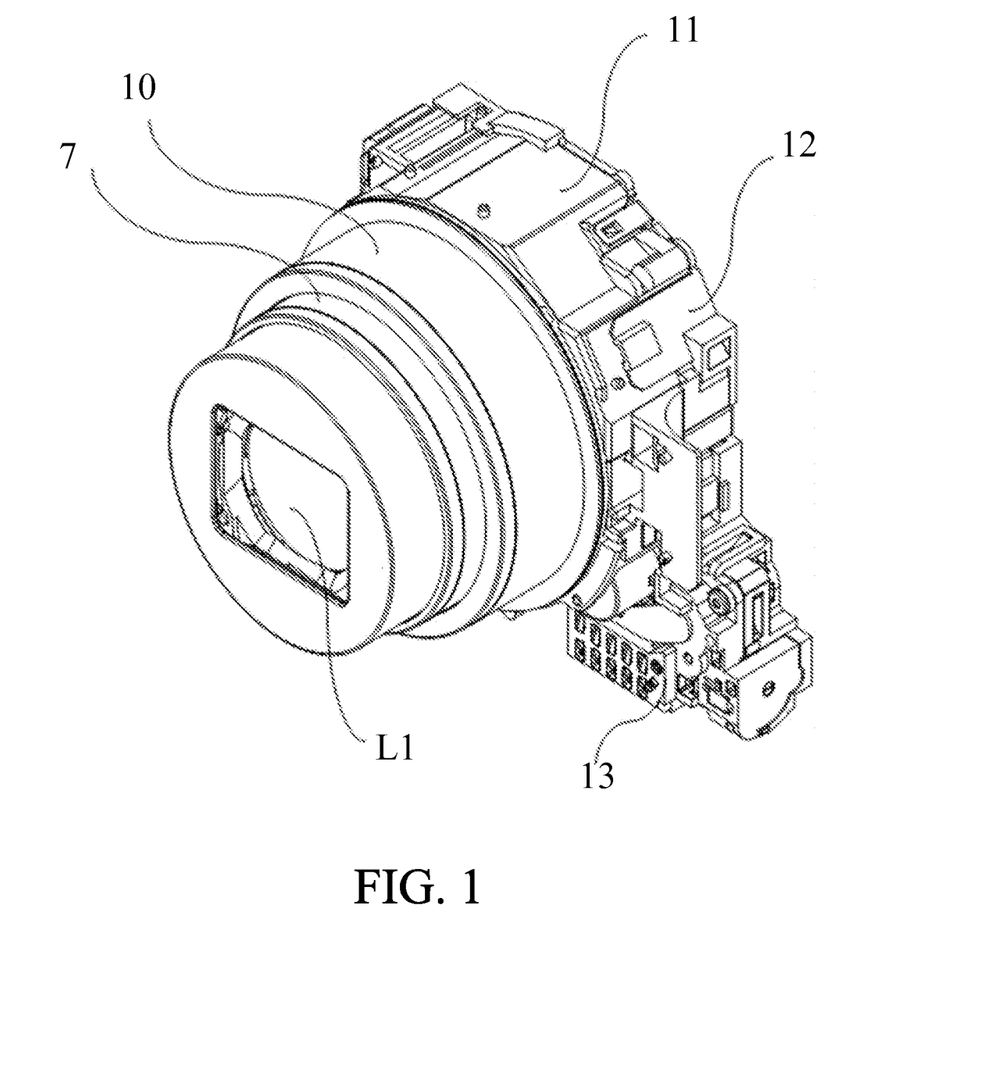
FIG. 1 is an appearance perspective view of a lens barrel according to an embodiment of the invention.
Figure 2A:
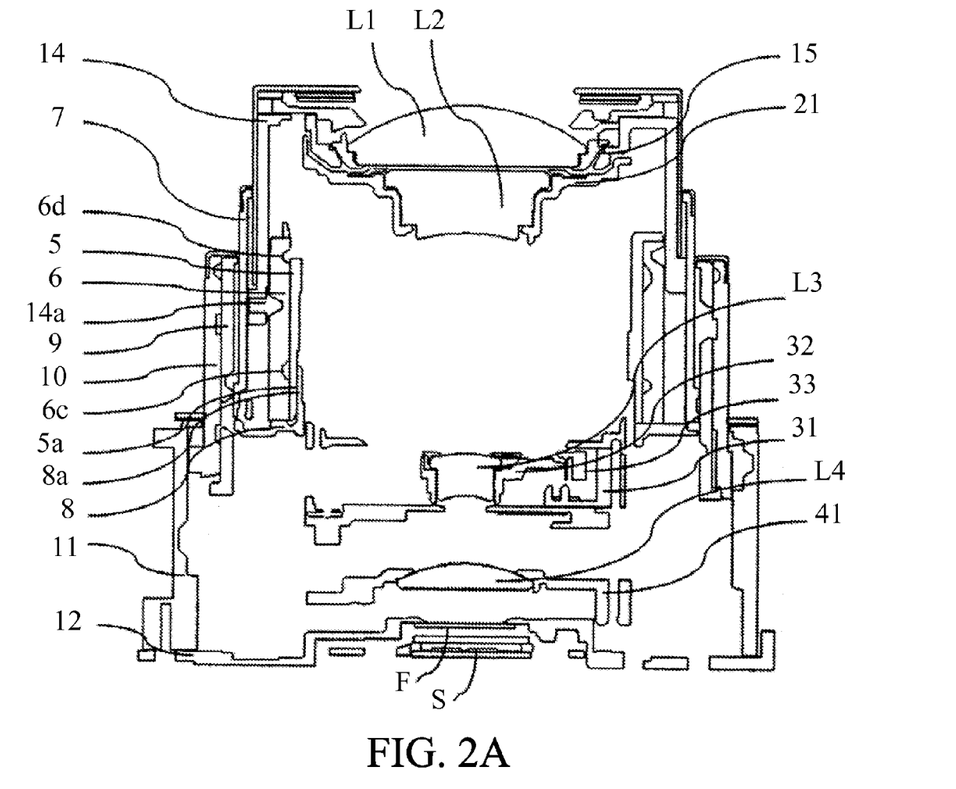
FIGS. 2A and 2B are sectional views of the lens barrel.
Figure 2B:
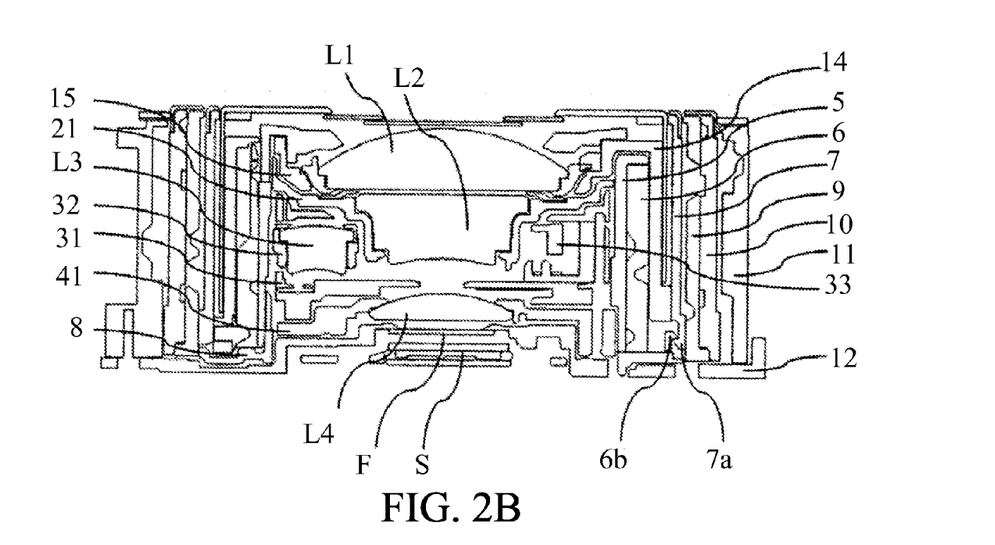
Figure 3:
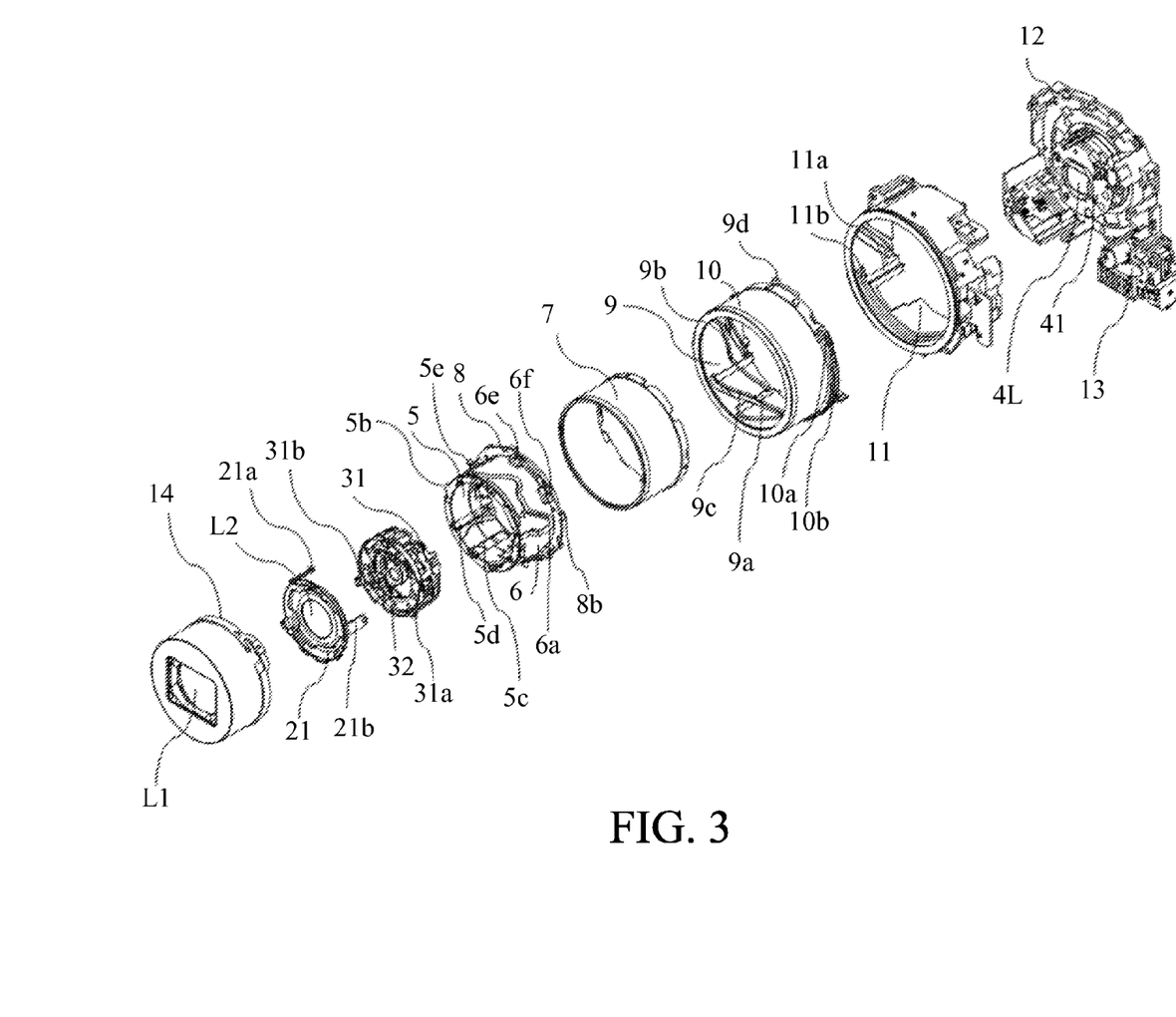
FIG. 3 is an exploded perspective view of the lens barrel.

First, a configuration of the lens barrel according to the embodiment of the invention is explained with reference to FIGS. 1 to 3. FIG. 1 is an appearance perspective view of the lens barrel according to the embodiment of the invention. FIGS. 2A and 2B are sectional views of the lens barrel. FIG. 2A illustrates a shooting state, and FIG. 2B illustrates a retracted state. FIG. 3 is an exploded perspective view of the lens barrel.

The lens barrel according to the embodiment of the invention is a four group lens optical system (image pickup optical system) including optical elements of a first group lens L1, a second group lens L2, a third group lens L3, and a fourth group lens L4.

A first group lens holder 15 holding the first group lens L1 is held by a first group lens barrel 14.

A straight barrel 5 is arranged inside of a cam barrel 6, and an engaging portion 5a provided on an inner periphery of the straight barrel 5 engages with an engaging claw 8a of a cam plate 8 arranged behind the straight barrel 5 and the cam barrel 6 in an optical axis. Therefore, the straight barrel 5, the cam barrel 6, and the cam plate 8 are unified.

Three straight keys 5b provided on an object side of an outer periphery of the straight barrel 5 engage with a straight groove (not illustrated) formed on an inner peripheral surface of the first group lens barrel 14. A cam pin 14a of three pieces arranged on an image surface side of the inner periphery of the first group lens barrel 14 engages with a cam groove 6a formed on an outer periphery of the cam barrel 6. Engagement between the cam pin 14a and the cam groove 6a and engagement between the straight groove (not illustrated) of the first group lens barrel 14 and the straight keys 5b moves the first group lens barrel 14 along the optical axis without rotating.

An engaging claw 6b which is provided on an image surface side of the outer periphery of the cam barrel 6 engages with an engaging claw 7a which is arranged on an image surface of an inner periphery of a cam cover 7.

A second group holder 21 holds the second group lens L2. A third group holder (holder) 32 holding the third group lens L3 is held by a magnet frame (moving member) 33.

Three cam pins 21a provided on the second group holder 21 engage with a cam groove 6c formed on an inner periphery of the cam barrel 6, and three cam pins 31a provided on a third group base plate (base member) 31 engage with a cam groove 6d formed on an inner periphery of the cam barrel 6. A straight key 21b of the second group holder 21 and a straight key 31b of the third group base plate 31 engage with straight grooves 5c, 5d, respectively, of the straight barrel 5, respectively. Engagement between the cam pin 21a and the cam groove 6c and engagement between the straight key 21b of the second group holder 21 and the straight groove 5c of the straight barrel 5 move the second group lens barrel 21 along the optical axis without rotating. Engagement between the cam pin 31a and the cam groove 6d and engagement between the straight key 31b and the straight groove 5d also move the third group base plate 31 along the optical axis without rotating.

Six straight keys 8b provided on an image surface of an outer periphery of the cam plate 8 engage with a key groove 9a of a straight cam barrel 9. A cam pin 6e provided on the image surface of the outer periphery of the cam barrel 6 engages with a cam groove 9b of the straight cam barrel 9, and a straight pin 6f passes into a straight groove 9c of the straight cam barrel 9 so as to engage with a straight key groove (not illustrated) formed on a rotating barrel 10.

Additionally, six keys provided on an outer periphery of the straight cam barrel 9 fits a key groove (not illustrated) formed on an inner periphery of the rotating barrel 10 by bayonet fastening so as to unify the straight cam barrel 9 and the rotating barrel 10. Then, a straight key 9d provided on the straight cam barrel 9 fits a key groove 11a formed on a fixed barrel 11, and three cam pins 10a provided on the rotating barrel 10 fits a cam groove 11b formed on the fixed barrel 11.

A gear portion 10b formed on the rotating barrel 10 is coupled with a lens barrel driver 13 including a DC motor and a plurality of gears. When the rotating barrel 10 is rotated by the lens barrel driver 13, the rotating barrel 10 moves along the optical axis while rotating by the fitting between the cam pins 10a and the cam groove 11b of the fixed barrel 11.

A fourth group holder 41 holding the fourth group lens L4 engages with a supporting axis (not illustrated) parallel to the optical axis, and thus, is supported movably along the optical axis.

An image pickup element S and an optical filter F are held on a fixing base plate 12. Additionally, the fixed barrel 11 is fixed to the fixing base plate 12 by a plurality of engaging portions (not illustrated).

When the lens barrel according to the embodiment is retracted, first the fourth group holder 41 moves in a retracted position, and second the third group holder 32 evacuates to an evacuating position. With evacuating of the third group holder 32, the first group lens barrel 14, the second group holder 21, the third base plate 31, the cam barrel 6, and the rotating barrel 10 are retracted. The third group holder 32 moves to a shooting position when shooting with extension of the first group lens barrel 14, the second group holder 21, the third group base plate 31, the cam barrel 6, and the rotating barrel 10 to an object side. And, the fourth group holder 41 moves to a predetermined position.

Next, a configuration of a third group lens unit including an image stabilizer is explained.

Figure 4:
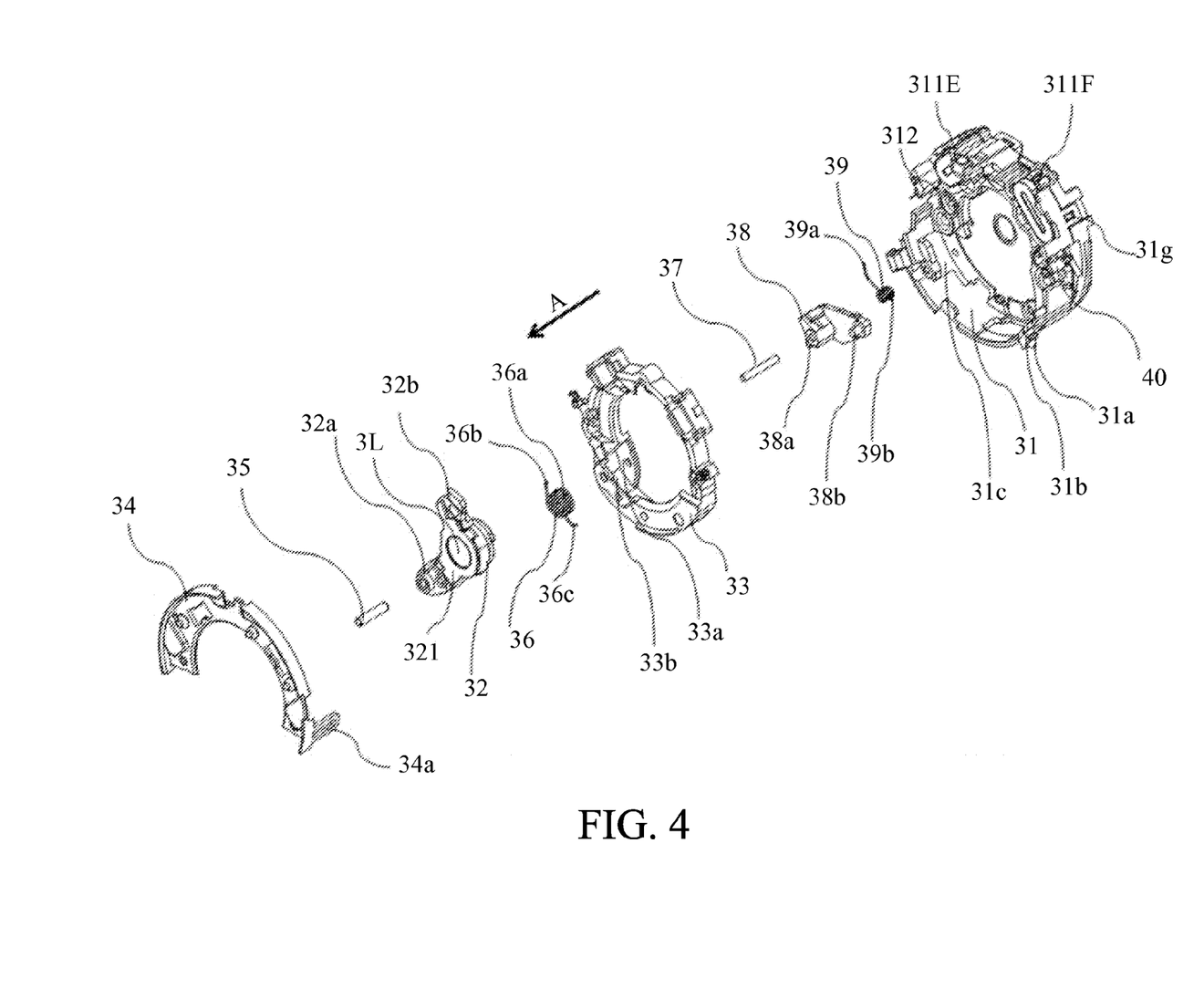
FIG. 4 is an exploded perspective view of a third group lens unit.
Figure 5:
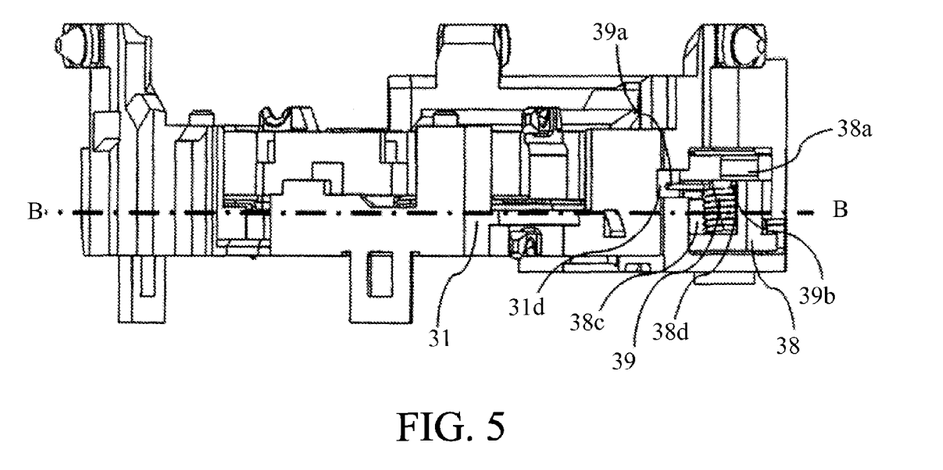
FIG. 5 is an exploded perspective view of the third group lens unit.
Figure 6A:
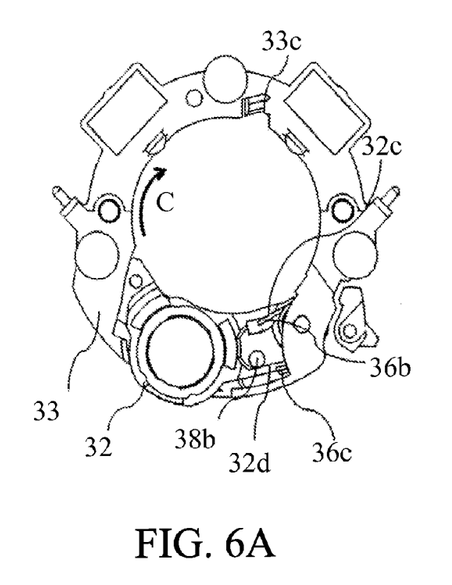
FIGS. 6A and 6B are sectional views of the B-B line in FIG. 5.
Figure 6B:
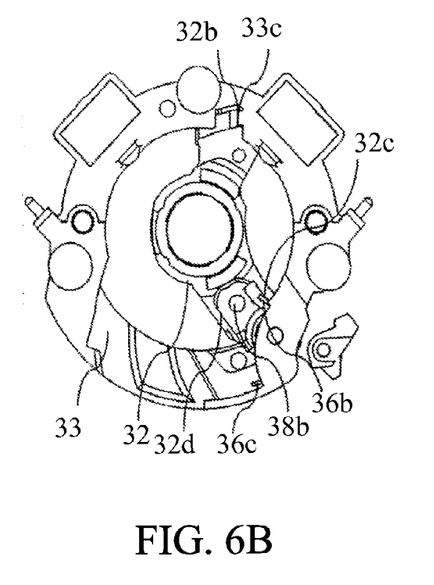
Figure 7A:
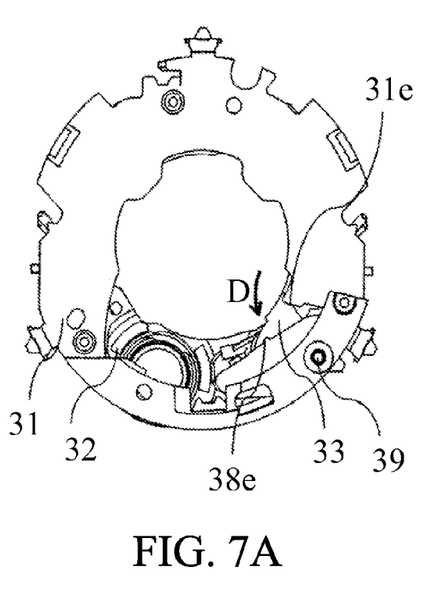
FIGS. 7A and 7B are schematic diagrams of the third group lens unit viewed from an image surface side.
Figure 7B:
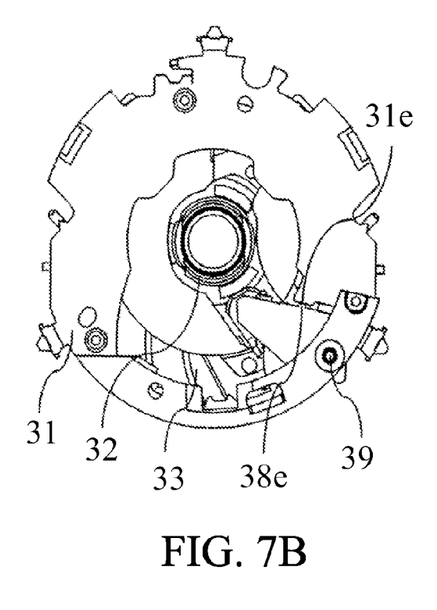

FIG. 4 is an exploded perspective view of a third group lens unit. FIG. 5 is an exploded perspective view of the third group lens unit. FIGS. 6A and 6B are sectional views of the B-B line in FIG. 5. FIG. 6A illustrates an evacuating state, and FIG. 6B illustrates a shooting state. FIGS. 7A and 7B are schematic diagrams of the third group lens unit viewed from an image surface side. FIG. 7A illustrates the evacuating state, and FIG. 7B illustrates the shooting state.

The third group lens unit includes the third group base plate 31, the third group holder 32, the magnet frame 33, and a sensor holder 34.

The third group holder 32 is rotatably supported by the magnet frame 33 since a sleeve 32a is inserted into an opening 33a so as to be pivotally supported by a third group holder supporting axis 35. At that time, a third group compression spring 36, which is a torsion spring, is attached to the sleeve 32a. A coil portion 36a of the third group compression spring 36 urges the third group holder 32 in an arrow A direction (an optical axis direction) in FIG. 4 so as to push to an upper side of the opening 33a of the magnet frame 33. This urging absorbs a backlash between the third group holder 32 and the magnet frame 33 in the optical axis direction.

In the evacuating state as illustrated in FIG. 6A, two arm portions 36b, 36c of the third group compression spring 36 respectively engage with a first wall portion 32c of the third group holder 32 and a wall portion 33b of the magnet frame 33. When the third group compression spring 36 urges in a rotating direction (arrow C direction in FIG. 6A) perpendicular to the optical axis, the third group holder 32 is urged to the shooting position as illustrated in FIG. 6B. When the third group holder 32 rotates to the shooting position where an optical center of the third group holder 32 is positioned on the optical axis, a third group rotation restricting surface 32b formed on the third group holder 32 abuts against a magnet frame rotation restricting surface 33c of the magnet frame 33. This abutment ensures the shooting position of the third group holder 32.

A third group lever 38 is inserted into an opening 31c formed on the third group base 31. A third group lever spring 39, which is a torsion spring, is inserted into an opening 38c formed on the third group lever 38. The third group lever 38 is supported rotatably around a third group lever supporting axis 37 relative to the third group base plate 31.

Additionally, two arm portions 39a, 39b of the third group lever spring 39 respectively engage with a wall portion 31d of the third group base plate 31 and an inside wall portion 38d of the third group lever 38. The third group lever 38 is urged in a shooting position direction (arrow C direction in FIG. 6A) by the third group lever spring 39. As illustrated in FIG. 7B, a third group lever abutting portion 38e abuts against a third group base plate lever abutting portion 31e of the third group base plate 31, and thus, the third group lever 38 is positioned.

When retracting, an evacuating angle portion 38a of the third group lever 38 engages with a cam groove 5e formed on the inner periphery of the straight barrel 5. The engagement between the evacuating angle portion 38a and the cam groove 5e evacuates the third group lever 38 rotationally around the third group supporting axis 37. Then, as illustrated in FIG. 7A, an evacuating pin 38b formed on a tip of the third group lever 38 engages with a second wall portion 32d of the third group holder 32. The third group holder 32 also rotates around the third group holder supporting axis in an arrow D direction in FIG. 7A according to rotation of the third group lever 38 for evacuation.

As described above, a center of the third group lens L3 held by the third group holder 32 is positioned on the optical axis in the shooting state, and is positioned at the evacuating position apart from the optical axis in the evacuating state.

As illustrated in FIG. 2B, the second group holder 21 is capable of entering into a space formed on a central opening of the magnet frame 33 when retracting since the third group holder 32 moves to the evacuating position.

Figure 8A:
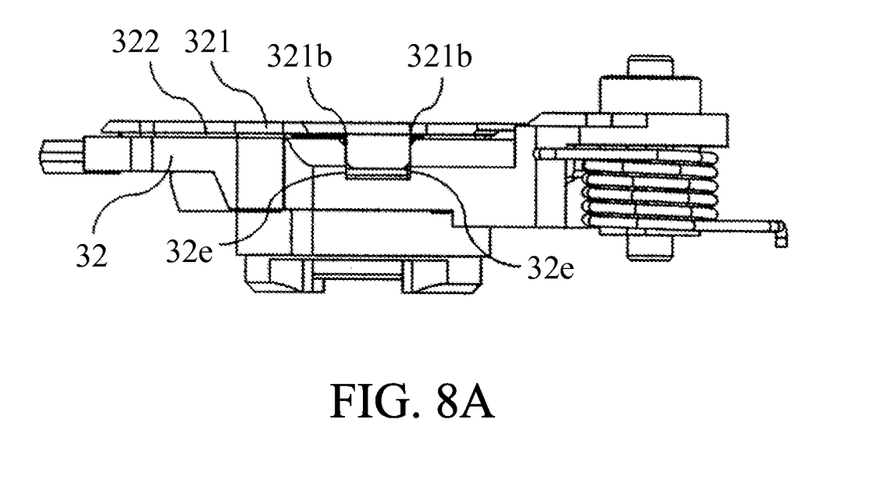
FIGS. 8A and 8B are sectional views of a third group holder.
Figure 8B:
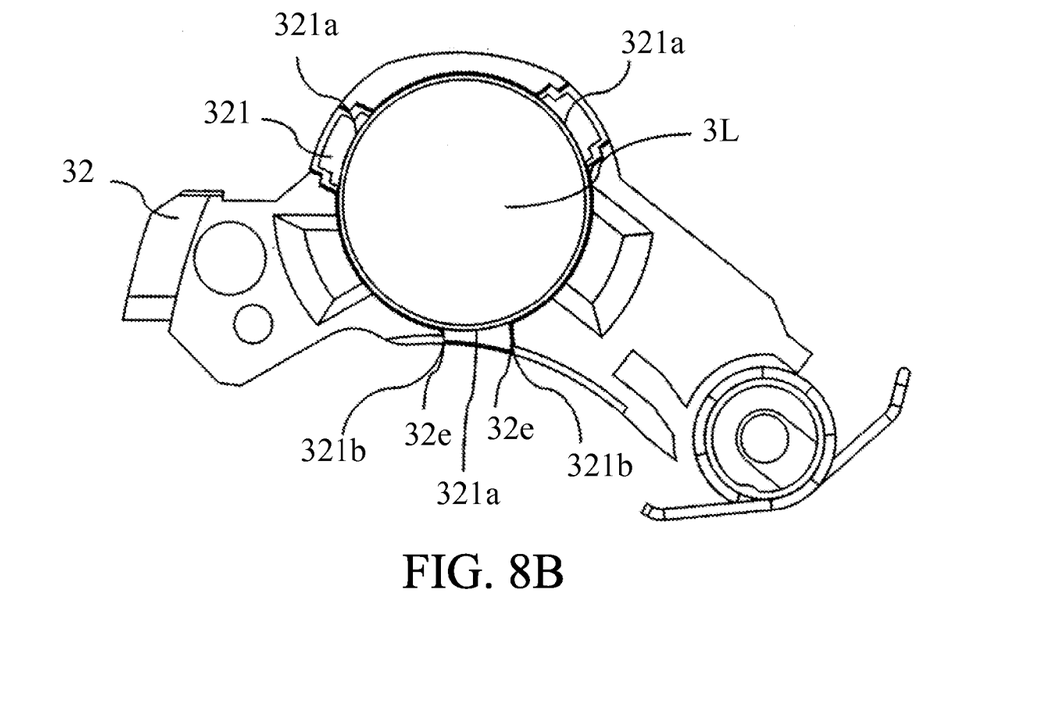

FIGS. 8A and 8B are sectional views of the third group holder 32. FIG. 8A is a side view, and FIG. 8B is a front view. As illustrated in FIGS. 8A and 8B, a fixed aperture stop (mask member) 321 is attached to the third group holder 32 by an adhesion tape 322. Three engaging portions are provided on the fixed aperture stop 321, and an inner periphery 321a of the engaging portions fits to an outer periphery of the third group lens L3. A side surface 321b of one engaging portion of the three engaging portions fits to a concave side surface 32e formed near a fitting member of the second group holder 32, and thus, the fixed aperture stop 321 is precisely held relative to the third group holder 32.

Next, image stabilizing according to the embodiment is explained.

Figure 9A:
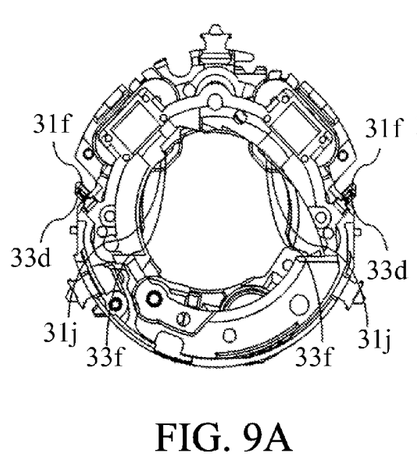
FIGS. 9A and 9B are schematic diagrams of the third group lens unit viewed from an object side.
Figure 9B:
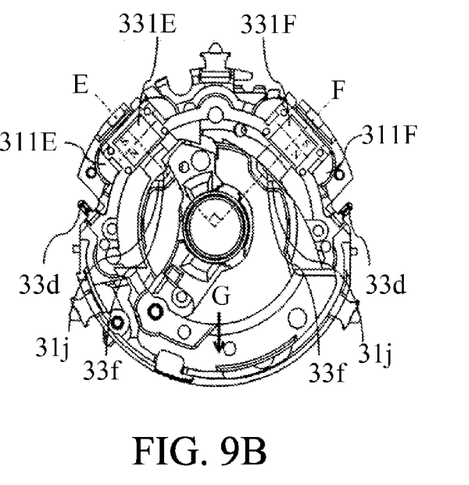
Figure 10A:
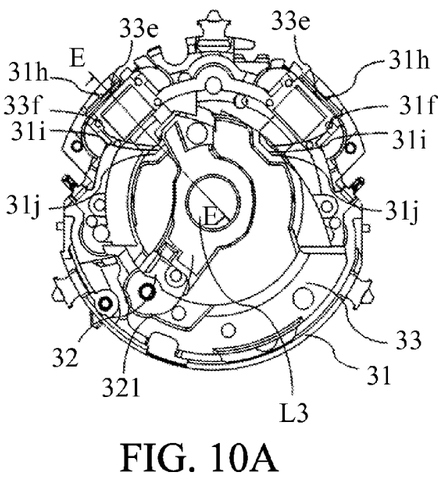
FIGS. 10A and 10B are sectional views of the third group lens unit.
Figure 10B:
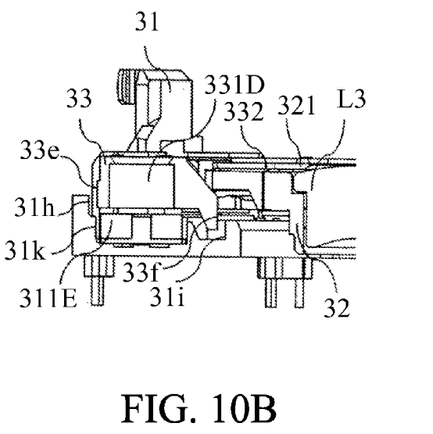

FIGS. 9A and 9B are schematic diagrams of the third group lens unit viewed from an object side. FIG. 9A illustrates the evacuating state, and FIG. 9B illustrates the shooting state. FIGS. 10A and 10B are sectional views of the third group lens unit. FIG. 10A is a front view, and FIG. 10B is a sectional view of the E-E line in FIG. 10A.

Two hook engaging portions 33d are provided on the magnet frame 33, and respectively hook a first end of coil spring (urging member) 40 applying tensile force. Second ends of the two coil springs 40 are hooked to hook engaging portions 31f of the third group base plate 31. Three non-magnetic balls (rolling element) 312 are sandwiched between the magnet frame 33 and the third group base plate 31. The coil spring 40 pushes the magnet frame 33 so that the balls 312 are sandwiched between the magnet frame 33 and the third group base plate 31. The magnet frame 33 is capable of freely moving in a translation direction and a rotation direction in a plane perpendicular to the optical axis since the pushing to the magnet frame 33 is performed through the balls 312. In the embodiment, the third group holder 32 integrated with the magnet frame 33 is moved in the plane so as to correct an image blur on the image pickup element S in the shooting state.

A coil unit 311E and a coil unit 311F include a coil and a bobbin, and are adhesively fixed to an indent 31k of the third group base plate 31. A third group flexible printed substrate (not illustrated, hereinafter referred to as "three group FPC") feeds a metal pin which is buried in the bobbin and is electrically coupled with the coil so as to feed the coil.

Magnets (magnetic member) 331E, 331F are integrally held by the magnet frame 33. The magnets 331E, 331F are magnetized in a direction as illustrated in FIG. 9B. A hole element (detector) attached to the third group FPC detects movement in "E" and "F" directions of the magnet frame 33 as a change of magnetic field, and moving amounts of the magnet frame 33 is calculated based on the detection result.

The hole element is pushed in the sensor holder 34 so as to be precisely positioned since positional precision of the magnets 331E, 331F and the hole element is important. An engaging claw 34a of the sensor holder 34 engages with an engaging portion 31g of the third group base plate 31, and thus, the sensor holder 34 is held by the third group base plate 31.

A driver including the magnets 331E, 331F and the coil units 311E, 311F translationally moves the magnet frame 33 in a "E" axis direction and a "F" axis direction perpendicular to the "E" axis direction.

As illustrated in FIGS. 10A and 10B, an upper end restricting surface 33e and a lower end restricting surface 33f are provided on the magnet frame 33. Additionally, an upper end restriction portion 31h and a lower end restricting portion 31i are provided on the third group base plate 31. The upper end restricting surface 33e and the lower end restricting surface 33f respectively abut against the upper end restriction portion 31h and the lower end restricting portion 31i, and thus, movement amounts of the magnet frame 33 is restricted. Restriction portions are arranged in both the "E" and "F" axis directions axis so as to sandwich each magnet on a line between the optical axis and a center of each magnet. Due to this arrangement, driving forces in the "E" and "F" axis direction of the third group holder 32 integrated with the magnet frame 33 perpendicular to each other at an optical center are capable of applying. Therefore, precise control is performable without generating unnecessary rotating force.

Next, operation of the magnet frame 33 when retracting is explained.

The third group lever 38 evacuates rotationally around the third group lever supporting axis 39 with a relation between the evacuating angle portion 38a and the cam groove 5e. At the same time, the evacuating pin 38b pushes the second wall portion 32d, and thus, the third group holder 32 evacuates rotationally around the third group supporting axis 35.

The third group holder 32 is held at the center of the optical axis by urging force of the coil spring 40 and the driver including the magnets 331E, 331F and the coil units 311E, 311F. The third group holder 32 moves in an arrow "G" direction in FIG. 9B along with the magnet frame 33 before rotationally evacuating since force which the second wall portion 32d receives from the evacuating pin 38b is larger than central holding force of the third group holder 32.

If moving amounts in the arrow "G" direction of the magnet frame 33 is too large, the second group holder 21 may interfere with the magnet frame 33 when the second group holder 21 enters into the space formed on the central opening of the magnet frame 33 for retracting. In the embodiment, as illustrated in FIGS. 10A and 10B, a movement in the "G" direction of the magnet frame 33 is restricted since an evacuating amount restricting portion 31j continuously formed in succession to the lower end restricting portion 31i of the third group base plate 31 abuts against the lower end restricting surface 33f of the magnet frame 33.

As described above, in the embodiment, precise image stabilizing is performable since restricting portions of an image stabilizer are arranged in a line between an optical axis and a center of magnets so as to sandwich magnets.

The invention provides an optical apparatus a small size optical apparatus which is performable for precise image stabilizing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-263098, filed on Dec. 19, 2013, which is hereby incorporated by reference herein in its entirety.

What is claimed is:

1. An optical apparatus comprising:
a base member where a first aperture is formed;
a moving member that is arranged on the base member and that includes a second aperture;
a holder that is arranged inside the second aperture and that holds an optical element for image blur correction,
wherein the holder is movable between (1) a shooting state where the optical element is positioned on an optical axis of an image pickup optical system and (2) an evacuating state where the optical element evacuates from the optical axis,
wherein the moving member is movable along with the holder relative to the base member in a plane perpendicular to the optical axis,
wherein the base member includes a first restricting portion restricting a first end of the moving member and a second restricting portion restricting a second end of the moving member when the holder moves in the plane perpendicular to the optical axis so as to correct an image blur,
wherein the first restricting portion is formed on an outer peripheral part side of the base member, and the second restricting portion is formed on an inner peripheral part side of the base member, which is a first aperture side,
wherein an upper end restricting portion is formed on an outer peripheral part side of the moving member, and a lower end restricting portion is formed on an inner peripheral part side of the moving member, which is a second aperture side,
wherein the first restricting portion abuts against the upper end restricting portion to restrict the first end, and
wherein the second restricting portion abuts against the lower end restricting portion to restrict the second end.

2. The optical apparatus according to claim 1, wherein, when viewed from the optical axis direction, the first restricting portion and the second restricting portion are arranged to sandwich a magnet, which is formed on the moving member and which is part of a driving member to move the moving member in the plane perpendicular to the optical axis.

3. The optical apparatus according to claim 1, wherein, when viewed from the optical axis direction, the first restricting portion and the second restricting portion are disposed on opposite sides of a magnet that is held by the moving member.

* * * * *